United States Patent
Benavides et al.

(10) Patent No.: US 10,096,175 B2
(45) Date of Patent: Oct. 9, 2018

(54) STRUCTURAL DAMAGE DETECTION

(71) Applicant: International Business Machines Corporation, Armonk, NY (US)

(72) Inventors: Marco A. Benavides, Dallas, TX (US); Stephanie De La Fuente, Dallas, TX (US); Gregory S. Jones, Lewisville, TX (US)

(73) Assignee: International Business Machines Corporation, Armonk, NY (US)

( * ) Notice: Subject to any disclaimer, the term of this patent is extended or adjusted under 35 U.S.C. 154(b) by 2 days.

(21) Appl. No.: 15/152,686

(22) Filed: May 12, 2016

(65) Prior Publication Data
US 2017/0330390 A1 Nov. 16, 2017

(51) Int. Cl.
| | | |
|---|---|---|
| *C07C 5/00* | (2006.01) | |
| *G07C 5/00* | (2006.01) | |
| *G07C 5/08* | (2006.01) | |
| *G01S 19/01* | (2010.01) | |
| *G01P 15/08* | (2006.01) | |

(52) U.S. Cl.
CPC .......... *G07C 5/008* (2013.01); *G01P 15/0802* (2013.01); *G01S 19/01* (2013.01); *G07C 5/0808* (2013.01)

(58) Field of Classification Search
CPC ............ G01M 5/0033; G01M 5/0066; G01M 5/0091; F41A 23/56; F41H 5/007; F41H 5/24; F41H 7/02; F41J 5/04; F41J 5/041; G01N 27/20; G01N 29/04; G06F 7/00; G06T 7/0004; G07C 5/00; G08B 13/126; H04N 7/18; H05K 13/00; Y10T 29/49117; Y02T 90/163
USPC ........ 701/33.2, 36; 702/35, 38, 56; 180/190; 340/425.5; 256/13.1; 280/492; 174/520; 242/557; 324/693
See application file for complete search history.

(56) References Cited

U.S. PATENT DOCUMENTS

| | | | |
|---|---|---|---|
| 5,774,376 A * | 6/1998 | Manning ............. | E02B 17/0034 702/56 |
| 8,019,501 B2 | 9/2011 | Breed | |
| 8,788,220 B2 * | 7/2014 | Soles ................... | G08B 13/126 324/693 |
| 2005/0108065 A1 | 5/2005 | Dortstatter | |
| 2005/0225175 A1 * | 10/2005 | Maehara ............... | B60W 10/06 307/10.1 |
| 2007/0265790 A1 * | 11/2007 | Sealing ............... | G01M 5/0033 702/33 |
| 2008/0029324 A1 * | 2/2008 | Plankenhom .......... | B62B 13/08 180/190 |
| 2009/0051510 A1 * | 2/2009 | Follmer ................. | G07C 5/008 340/425.5 |

(Continued)

*Primary Examiner* — Anne Marie Antonucci
*Assistant Examiner* — Sanjeev Malhotra
(74) *Attorney, Agent, or Firm* — Steven M. Greenburg, Esq.; CRGO Law

(57) ABSTRACT

Embodiments of the present invention provide a method, system and computer program product for structural damage detection in a vehicle. The method includes detecting a change in tension of a wire coupled to two different nodes of a multiplicity of nodes tethered to one another by way of tensioned wires and affixed to a portion of a vehicle. Thereafter, in response to the detection, data is uploaded that includes the change in tension to a computer remote form the vehicle over a computer communications network.

17 Claims, 2 Drawing Sheets

(56) References Cited

U.S. PATENT DOCUMENTS

| | | | |
|---|---|---|---|
| 2011/0062403 A1* | 3/2011 | Neusch | E01F 13/12 256/13.1 |
| 2011/0071770 A1* | 3/2011 | Telgkamp | G01M 5/0033 702/35 |
| 2011/0095252 A1* | 4/2011 | Dyke | E01F 15/146 256/13.1 |
| 2011/0160935 A1* | 6/2011 | Newman | B60H 1/00735 701/2 |
| 2012/0191375 A1* | 7/2012 | Soles | G08B 13/126 702/38 |
| 2012/0226409 A1* | 9/2012 | Seize | G01M 5/0033 701/33.2 |
| 2013/0021138 A1 | 1/2013 | Ezzat et al. | |
| 2013/0062860 A1* | 3/2013 | Hao | B60D 5/00 280/492 |
| 2013/0175083 A1* | 7/2013 | Bonwit | B60L 11/1818 174/520 |
| 2013/0193256 A1* | 8/2013 | Hawkes | B65H 75/4484 242/557 |
| 2014/0095019 A1* | 4/2014 | Okamura | B62D 37/00 701/36 |
| 2014/0309805 A1 | 10/2014 | Ricci | |

\* cited by examiner

STRUCTURAL DAMAGE DETECTION

BACKGROUND OF THE INVENTION

Field of the Invention

The present invention relates to structural integrity monitoring and more particularly to structural damage detection.

Description of the Related Art

The modern vehicle be it a motor vehicle, aircraft or watercraft, consists primarily of a frame, a support structure and propulsion components in additional to onboard mechanical, electromechanical and electrical and electronic systems. In some instances, the frame and support structure remain separate from one another and in other instances, the frame and support structure are integrated as a single unit. In combination, the frame, support structure and propulsion components ensure that the vehicle is operable for its intended purpose while maintaining a requisite degree of assured safety during operation. Structural integrity refers to the structural ability of the frame, support structure and propulsion components to permits the operation of the vehicle while reasonable assuring the safety of its operator. Thus, the structural integrity of the vehicle is of paramount importance.

Since the advent of modern vehicular technology, it is presumed that every vehicle has a probability of experiencing damage. Generally, damage is anticipated to be the result of a collision of the vehicle with another vehicle or stationary object. As well, damage may occur as a result of forces of nature and in particular, the weather. Consequently, the frame, support structure and propulsion components generally include design aspects intended to minimize the damage resulting from a collision while maintaining the structural integrity of the vehicle. As a result of recent advances in engineering, then, the modern vehicle oftentimes enjoys structural integrity and remains operable despite having experienced damage.

BRIEF SUMMARY OF THE INVENTION

Embodiments of the present invention address deficiencies of the art in respect to vehicle damage assessment and provide a novel and non-obvious method, system and computer program product for structural damage detection in a vehicle. The method includes detecting a change in tension of a wire coupled to two different nodes of a multiplicity of nodes tethered to one another by way of tensioned wires and affixed to a portion of a vehicle. Thereafter, in response to the detection, data is uploaded that includes the change in tension to a computer remote from the vehicle over a computer communications network. In aspects of the embodiment, the data includes a timestamp for when detected change in tension occurred, or an identification of the two different nodes for correlation with a particular location on the vehicle, or global positioning system (GPS) coordinates of a location of the vehicle when the detected change in tension occurred, or a digital image acquired from the vehicle when the detected change in tension occurred, or an indication of whether or not smoke or water is present in the vehicle, or an indication of a velocity of the vehicle when the detected change in tension occurred.

In another embodiment of the invention, a vehicular data processing system is configured for structural damage detection in a vehicle. The system includes a computer disposed within a vehicle, the computer including at least one processor and memory. The system also includes a multiplicity of nodes tethered to one another by way of tensioned wires are affixed to a portion of a vehicle. In this regard, each of the nodes includes a tension sensor measuring changes in tension of a coupled one of the tensioned wires, each of the nodes having a communicatively coupling to the computer. Finally, the system includes a structural damage detection module executing in the computer. The module includes program code executing in the memory of the computer and detecting a change in tension of one of the tensioned wires coupled to two different ones of the multiplicity of nodes and responding to the detection by uploading data including the change in tension to a computer remote from the vehicle.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for structural damage detection in a vehicle. In accordance with an embodiment of the invention, a multiplicity of nodes tethered to one another by way of tensioned wires are affixed to a portion of a vehicle. Each of the nodes includes a tension sensor measuring changes in tension of a coupled one of the tensioned wires. Each of the nodes further is communicatively coupled to a processor and memory in which changes in tension are recorded by the processor and in which the changes are time-stamped by the processor. Optionally, GPS circuitry is coupled to the processor and GPS coordinates are included with the changes when recorded by the processor. Thereafter, the changes in the memory are extracted and analyzed such that a threshold change in the tension of a wire or wires coupled to a corresponding one of the node or nodes can be detected and grouped according to location, time or both, and interpreted as a group, as indicative of a breach of the structural integrity of the vehicle.

Figure 1:
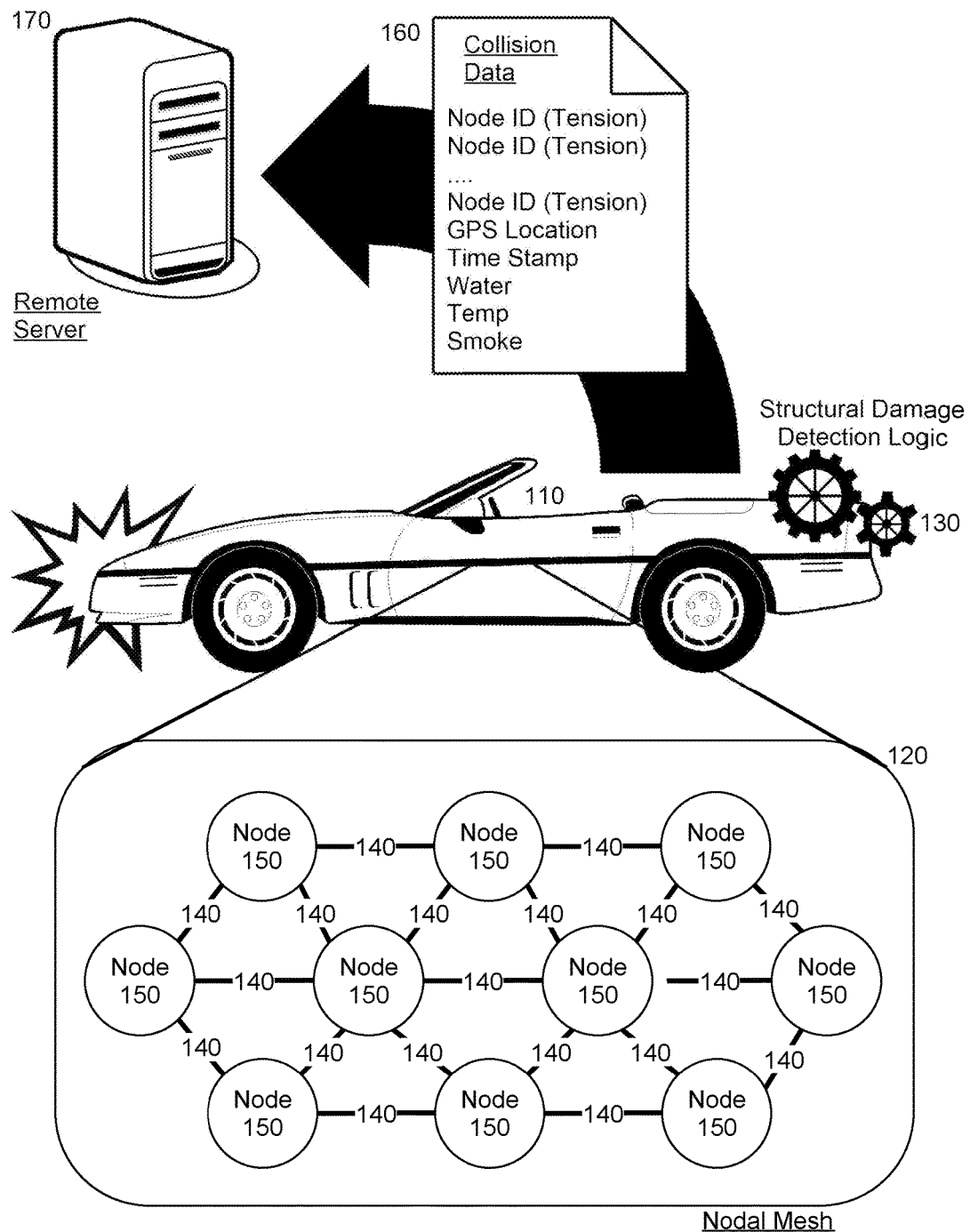
FIG. 1 is a pictorial illustration of a process for structural damage detection in a vehicle.

In further illustration, FIG. 1 pictorially shows a process for structural damage detection in a vehicle. As shown in FIG. 1, a vehicle 110 is equipped with multiple different nodal meshes 120. Each nodal mesh 120 includes a multiplicity of nodes 150 coupled to one another with wire 140 affixed between pairs of the nodes 150 at a particular measurable tension. Each of the nodes 150 includes a tension sensor that measures a change in the tension of a coupled one of the wires 140. Each of the nodes 150 as well include memory sufficient to store a value for a contemporaneously sensed tension for each coupled one of the wires 140.

Structural damage detection logic 130 operates in an onboard computer in the vehicle. The structural damage detection logic 130 communicates with each of the nodes 150 in each nodal mesh 120 in order to read therefrom changes in tension values for selected ones of the nodes 150. As it is to be understood, a change in tension v+ alue will occur when a surface to which the nodal mesh 120 is affixed is deformed so as to cause individual ones of the wires 140 to stretch and even break, or go slack from a contraction of the corresponding surface. In this regard, to the extent the wires 140 are formed of conductive material, a current can be passed across the wires 140 such that a breakage of one of the wires 140 will result in no measured current in the one of the wires 140. In any event, in response to determining that a threshold change in tension has occurred within a node 150 of a corresponding nodal mesh 120, the structural damage detection logic 130 may conclude that a collision has occurred or other structurally damaging event has occurred in connection with the vehicle.

Once structural damage detection logic 130 concludes that a collision or other physically impactful event may have occurred in connection with the vehicle 110, the structural damage detection logic 130 transmits data 160 to a remote server 170 including the tension values read from the different nodes 150 of affected ones of the nodal meshes 120. The data 160 also may include a time stamp indicating when the prospective collision has occurred, a GPS location of the vehicle at the time of the prospective collision, an indication of whether water has intruded upon an interior portion of the vehicle 110, an indication of whether smoke has intruded upon an interior portion of the vehicle 110, and a temperature measured in an interior portion of the vehicle 110.

Reducing the data 160, the remote server 170 may ascertain which portions of the vehicle 110 have experienced damage in connection with the prospective collision based upon an identifier of affected ones of the nodes 150 of a corresponding nodal mesh 120. The remote server 170 also may ascertain which damage visible on the vehicle is the result of the prospective collision based upon the time stamp information in the data 160. As well, the remote server 170 may ascertain whether or not the vehicle 110 has become submerged, or engulfed in smoke and flame based upon the water, smoke and temperature information disposed within the data 160.

Figure 2:
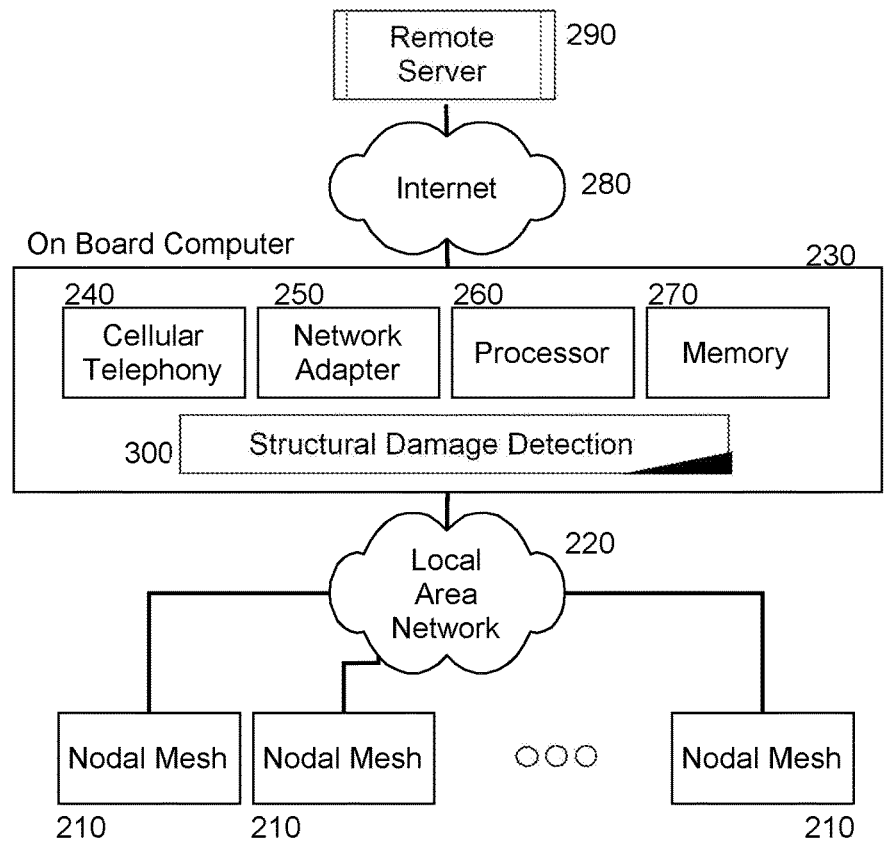
FIG. 2 is a schematic illustration of a vehicular data processing system configured for structural damage detection in a vehicle; and, FIG. 3 is a flow chart illustrating a process for structural damage detection in a vehicle.

The process described in connection with FIG. 1 may be implemented in a vehicular data processing system. In yet further illustration, FIG. 2 schematically shows a vehicular data processing system configured for structural damage detection in a vehicle. The system includes an onboard computer 230 that includes memory 270, one or more central processing units 260, a network adapter 250 and cellular telephony circuitry 240 so as to support network data communications over the Internet 280 utilizing a cellular telephonic link. The onboard computer 230 is communicatively linked by way of a wireless or wire-bound local area network 220 to different nodal meshes 210 affixed to different portions of a vehicle such as upon an interior or exterior surface of a frame of the vehicle, upon the support structure of the vehicle or upon one or more propulsion components of the vehicle.

Of note, a structural damage detection module 300 executes in the memory 270 of the onboard computer 230. The structural damage detection module 300 includes program code that, during execution, monitors the nodes of the different nodal meshes 210 and retrieves changes in wire tension of the nodal meshes 210 so as to detect a threshold change in wire tension in a given one of the nodal meshes 210 that is indicative of a collision or other damaging event. In response to determining a prospective occurrence of a collision or other damaging event, the program code of the structural damage detection module 300 arranges data pertaining to the given one of the nodal meshes 210 including a time stamp and GPS location coordinates of the vehicle. Thereafter, the program code of the structural damage detection module 300 transmits the data over the Internet 280 to a remotely disposed remote server 290.

Figure 3:
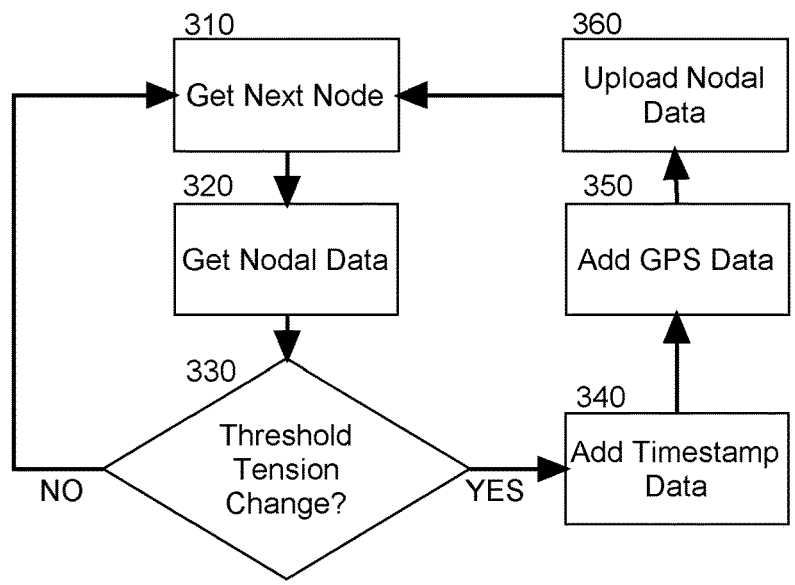

In even yet further illustration of the operation of the structural damage detection module 300, FIG. 3 is a flow chart illustrating a process for structural damage detection in a vehicle. Initially, program code of the structural damage detection module 300 measures a nominal tension in each node of the nodal mesh and thereafter, beginning in block 310, structural damage detection module 300 selects a first node in a corresponding nodal mesh for processing and in block 320, structural damage detection module 300 retrieves nodal data for the node including tension data for one or more wires affixed to the selected node. In decision block 330, structural damage detection module 300 analyzes the retrieved tension data to determine whether or not a threshold change in tension has occurred in one or more of the wires. In this regard, structural damage detection module 300 measures a new tension for the selected node and structural damage detection module 300 compares the measured new tension to the nominal tension to compute a tension change. Optionally, to account for only temporary changes in tension, the structural damage detection module 300 measures the comparison at least twice with an threshold interval of time disposed therebetween.

If a threshold change in tension is not determined, in block 310 structural damage detection module 300 selects a next node in the nodal mesh for processing and the process may repeat through block 320. Otherwise, the process proceeds through block 340. In block 340, structural damage detection module 300 adds time stamp data to the nodal data to indicate a time commensurate with when the threshold change in tension has occurred. As well, in block 350 structural damage detection module 300 retrieves GPS location data for the vehicle and adds the GPS location data to the nodal data. Finally, in block 360 structural damage detection module 300 uploads the nodal data to the remote server for further data reduction. Thereafter, structural damage detection module 300 selects a next node in the nodal mesh for processing in block 310 and the process repeats in block 320.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows.

We claim:

1. A method for structural damage detection in a vehicle, the method comprising:

detecting a change in tension of a wire coupled to two different nodes of a multiplicity of nodes tethered to one another by way of tensioned wires and the multiplicity of nodes having been affixed to an interior portion of a vehicle; and responsive to the detection, determining whether or not either water or smoke has intruded into the interior portion and also determining a temperature within the interior portion of the vehicle, and uploading data including the change in tension, the temperature of the interior portion of the vehicle and whether or not smoke or water has intruded into the interior portion of the vehicle, to a computer remote from the vehicle over a computer communications network.

2. The method of claim 1, wherein the uploaded data includes a timestamp for when detected change in tension occurred.

3. The method of claim 1, wherein the uploaded data includes an identification of the two different nodes for correlation with a particular location on the vehicle.

4. The method of claim 1, wherein the uploaded data includes global positioning system (GPS) coordinates of a location of the vehicle when the detected change in tension occurred.

5. The method of claim 1, wherein the uploaded data includes a digital image acquired from the vehicle when the detected change in tension occurred.

6. The method of claim 1, wherein the uploaded data includes an indication of a velocity of the vehicle when the detected change in tension occurred.

7. A vehicular data processing system configured for structural damage detection in a vehicle, the system comprising:

a computer disposed within a vehicle, the computer comprising at least one processor and memory;

a multiplicity of nodes tethered to one another by way of tensioned wires are affixed to a portion of a vehicle, each of the nodes comprising a tension sensor measuring changes in tension of a coupled one of the tensioned wires, each of the nodes having a communicatively coupling to the computer; and, a structural damage detection module executing in the computer, the module comprising program code executing in the memory of the computer and detecting a change in tension of one of the tensioned wires coupled to two different ones of the multiplicity of nodes and responding to the detection by determining whether or not either water or smoke has intruded into the interior portion and also determining a temperature within the interior portion of the vehicle, and uploading data including the change in tension, the temperature of the interior portion of the vehicle and whether or not smoke or water has intruded into the interior portion of the vehicle, to a computer remote from the vehicle over a computer communications network.

8. The system of claim 7, wherein the uploaded data includes a timestamp for when detected change in tension occurred.

9. The system of claim 7, wherein the uploaded data includes an identification of the two different nodes for correlation with a particular location on the vehicle.

10. The system of claim 7, wherein the uploaded data includes global positioning system (GPS) coordinates of a location of the vehicle when the detected change in tension occurred.

11. The system of claim 7, wherein the uploaded data includes a digital image acquired from the vehicle when the detected change in tension occurred.

12. A computer program product for structural damage detection in a vehicle, the computer program product comprising a non-transitory computer readable storage medium having program instructions embodied therewith, the program instructions executable by a device to cause the device to perform a method comprising:

detecting a change in tension of a wire coupled to two different nodes of a multiplicity of nodes tethered to one another by way of tensioned wires and the multiplicity of nodes having been affixed to a portion of a vehicle; and, responsive to the detection, determining whether or not either water or smoke has intruded into the interior portion and also determining a temperature within the interior portion of the vehicle, and uploading data including the change in tension, the temperature of the interior portion of the vehicle and whether or not smoke or water has intruded into the interior portion of the vehicle, to a computer remote from the vehicle over a computer communications network.

13. The computer program product of claim 12, wherein the uploaded data includes a timestamp for when detected change in tension occurred.

14. The computer program product of claim 12, wherein the uploaded data includes an identification of the two different nodes for correlation with a particular location on the vehicle.

15. The computer program product of claim 12, wherein the uploaded data includes global positioning system (GPS) coordinates of a location of the vehicle when the detected change in tension occurred.

16. The computer program product of claim 12, wherein the uploaded data includes a digital image acquired from the vehicle when the detected change in tension occurred.

17. The computer program product of claim 12, wherein the uploaded data includes an indication of a velocity of the vehicle when the detected change in tension occurred.

* * * * *